United States Patent [19]

Yamamori

[11] Patent Number: 5,225,101
[45] Date of Patent: Jul. 6, 1993

[54] POLYOL COMPOSITIONS FOR PRODUCING RIGID POLYURETHANE FOAMS

[75] Inventor: Satofumi Yamamori, Kawabe, Japan

[73] Assignee: Takeda Chemical Industries, Ltd., Osaka, Japan

[21] Appl. No.: 732,428

[22] Filed: Jul. 18, 1991

Related U.S. Application Data

[63] Continuation of Ser. No. 378,621, Jul. 12, 1989, abandoned.

[30] Foreign Application Priority Data

Jul. 15, 1988 [JP] Japan ................. 63-176796

[51] Int. Cl.⁵ .............................. C09K 3/00
[52] U.S. Cl. ............. 252/182.25; 252/182.24; 252/182.26; 252/182.27; 521/164; 521/175; 521/177
[58] Field of Search ........ 252/182.24, 182.25, 252/182.26, 182.27

[56] References Cited

U.S. PATENT DOCUMENTS

| | | | |
|---|---|---|---|
| 3,433,751 | 3/1969 | Yotsuzuka et al. | 252/182.25 X |
| 3,583,926 | 6/1971 | Zwolinski et al. | 252/182.27 |
| 3,703,489 | 11/1972 | Morehouse | 252/182.27 X |
| 3,737,391 | 6/1973 | Feltzin et al. | 252/182.27 |
| 3,833,526 | 9/1974 | Cear et al. | 252/182.27 X |
| 4,342,842 | 8/1982 | Hira et al. | 521/167 |

Primary Examiner—Richard D. Lovering
Attorney, Agent, or Firm—Wendroth, Lind & Ponack

[57] ABSTRACT

A polyol composition for producing rigid polyurethane foams which comprises:
(a) a first polyol having the general formula of

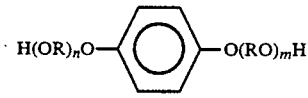

wherein R independently represents an ethylene group or a propylene group, m and n are integers of not less than 1, respectively, and m+n are in the range of 3-40, in amounts of 20-50% by weight based on the polyol composition; and
(b) a second polyol selected from the group consisting of adducts of alkylene oxides to at least one member of three or more functional polyhydric alcohols and polyamino compounds.

The resultant rigid polyurethane foams have high heat resistance and toughness as well as high mechanical properties, but have no voids therein.

8 Claims, No Drawings

POLYOL COMPOSITIONS FOR PRODUCING RIGID POLYURETHANE FOAMS

This application is a continuation of now abandoned application Ser. No. 07/378,621 filed on Jul. 12, 1989, now abandoned.

This invention relates to a polyol composition for producing rigid polyurethane foams which are in particular of high heat resistance and durability.

Rigid polyurethane foams have heretofore been produced by using relatively low molecular weight polyols of high functionality as polyol components. For instance, a method is disclosed in Japanese Patent Publication No. 57-45770, wherein polyols which contain ethylene oxide or propylene oxide adducts to six to eight functional polyhydric alcohols such as sorbitol or sucrose and ethylene oxide or propylene oxide adducts to glycerine are used to improve toughness of rigid foams. A method is also known wherein polyols which contain alkylene oxide adducts to 4,4'-diaminodiphenylmethane are used as polyol components in U.S. Pat. No. 4,342,842.

Although, these known rigid polyurethane foams are of good mechanical properties as they are produced, but of insufficient heat resistance, so that when they are used at high temperature, they lose their strength within a short period of time, and hence they are short of durability.

Therefore, an improved method of producing rigid polyurethane foams has been proposed in Japanese Patent Laid-open No. 59-47223 wherein a mixture of adducts of alkylene oxides to bisphenol A and adducts of alkylene oxides to aromatic polyamino compounds such as 2,6-tolylenediamine are used to improve toughness of rigid foams. Further, the co-use as polyol components of adducts of alkylene oxides to aromatic polyhydric compounds such as hydroquinone is made reference to therein. The resultant rigid foam is allegedly suitable for use as industrial parts, in particular, sliding parts or coating materials. This foam has been improved to an extent in heat resistance, but it has been found still insufficient in mechanical strength such as toughness.

It is, therefore, an object of the invention to provide a polyol composition for producing rigid polyurethane foams which have high heat resistance and toughness as well as excellent mechanical properties such as toughness.

In accordance with the invention, there is provided a polyol composition for producing rigid polyurethane foams which comprises:

(a) a first polyol having the general formula of

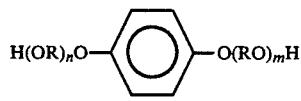

(I)

wherein R independently represents an ethylene group or a propylene group, m and n are integers of not less than 1, respectively, and m+n are in the range of 3-40, in amounts of 20-50% by weight based on the polyol composition; and (b) a second polyol selected from the group consisting of adducts of alkylene oxides to at least one member of three or more functional polyhydric alcohols and polyamino compounds.

The first polyols in the polyol composition of the invention may be produced by adding ethylene oxide or propylene oxide or both to hydroquinone or 1,4-bis(hydroxyethoxy)benzene as represented by the formula

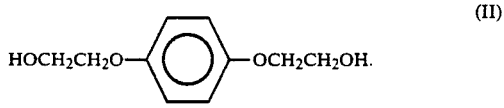

(II)

The adducts are obtained usually as mixtures which have varied values of m and n.

It is necessary that in the above formula (I), m and n are integers of not less than 1, respectively, and m+n, i.e., the moles of the alkylene oxides represented by —RO— are in the range of 3-40. When the moles of the alkylene oxides in the adducts are more than 40, the resultant rigid polyurethane foams are inferior in mechanical strength, in particular, in flexural strength, as well as in heat resistance. On the other hand, when the moles of the alkylene oxides in the adducts are less than 3, the resultant rigid polyurethane foams are of high heat resistance, but of insufficient toughness, so that they may not be put to practical use as rigid foam products.

It is convenient to designate the properties of polyols used by hydroxyl values in the production of polyurethane foams, and in this regard, the first polyols or the adducts have preferably a hydroxyl value of 50-480.

The first polyol is contained in the composition in amounts of 20-50% by weight based on the polyol composition. When the first polyol is contained in amounts of less than 20% by weight based on the polyols composition, the resultant rigid polyurethane foams are still inferior in toughness and heat resistance. On the other hand, when the first polyol is contained in amounts of more than 50% by weight based on the polyols composition, the resultant rigid polyurethane foams are too small in hardness to use them as practical products. Preferably the first polyol is contained in the polyol composition in amounts of 25-45% by weight.

The polyol composition of the invention further contains a polyether polyol as a second polyol, in addition to the first polyol. This polyether polyol is selected from the group consisting of adducts of alkylene oxides to at least one member of three or more functional polyhydric alcohols and polyamino compounds. The polyether polyol is obtained by adding alkylene oxides to at least one member of three or more functional polyhydric alcohols and polyamino compounds as initiators. Ethylene oxide, propylene oxide, or butylene oxide may be used as the alkylene oxides, but ethylene oxide or propylene oxide, or both, are preferred. The second polyols thus obtained have a hydroxyl value preferably of not less than 400, more preferably in the range of 450-1000. The second polyols may be used singly or as mixtures of two or more.

The functionality of the polyhydric alcohols and polyamino compounds herein is based on the number of active hydrogens which the compounds possess. Namely, the functionality of the polyhydric alcohols is equal to the number of the hydroxyl groups in the molecule of the alcohols. The polyamino compounds used include such compounds as have only amino groups as functional groups, and such compounds as have, for example, hydroxyl groups in addition to amino groups therein, as functional groups, as exemplified by alkanolamines. The functionality of the former polyamino compounds is equal to the number of active hydrogens of the amino groups of the compounds, whereas the functionality of the latter polyamino compounds or alkanolamines is equal to the number of the hydroxyl groups and active hydrogens of the amino groups of the compounds.

Aliphatic polyhydric alcohols or alicyclic polyhydric alcohols are preferably used as the polyhydric alcohols. Thus, the aliphatic polyhydric alcohols and alicyclic polyhydric alcohols used include, for example, glycerine, trimethylolpropane, pentaerythritol, diglycerine, sorbitol or sucrose. The polyamino compounds having amino groups only as functional groups used may be exemplified by aliphatic polyamines such as (poly)alkylene polyamines, for instance, ethylenediamine, diethylenetriamine or triethylenetetramine, and aromatic polyamines such as 4,4'-diaminodiphenylmethane or tolylenediamine. The alkanolamines used may be exemplified by monoethanolamine, diethanolamine, triethanolamine, monopropanolamine, dipropanolamine or tripropanolamine.

The polyol composition of the invention may further contain, as a third polyol, adducts of alkylene oxide to glycols such as ethylene glycol, diethylene glycol, propylene glycol or dipropylene glycol. There may be used ethylene oxide, propylene oxide or butylene oxide, for example, as the alkylene oxides, and ethylene oxide or propylene oxide or both are preferred.

The polyol composition of the invention is used together with polyisocyanates in the production of rigid polyurethane foams. The polyisocyanates used in the invention are not specifically limited, but a variety of aromatic, aliphatic or alicyclic polyisocyanates may be suitably used. Thus, the polyisocyanates used include, for example, 2,4-tolylene diisocyanate, 2,6-tolylene diisocyanate, mixtures of 2,4-/2,6-tolylene diisocyanate such as in ratios of 80/20 (TDI-80) or 65/35 (TDI-65), crude tolylene diisocyanates, diphenylmethane diisocyanate, polyphenylene-polymethylene polyisocyanate known as crude MDI, dianisidine diisocyanate, toluidine diisocyanate, xylylene diisocyanate, bis(2-isocyanatoethyl)fumarate, bis(2-isocyanatoethyl)maleate, bis(2-isocyanatoethyl)carbonate, 1,6-hexamethylene diisocyanate, 1,4-tetramethylene diisocyanate, 1,10-decamethylene diisocyanate, cumene-2,4-diisocyanate, 4-methoxy-1,3-phenylene diisocyanate, 4-bromo-1,3-phenylene diisocyanate, 4-ethoxy-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4'-diisocyanatodiphenyl ether, bis-5,6-(isocyanatoethyl)bicyclo[2,2,1]heptene-2, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 1,4-anthracene diisocyanate, 2,5-fluorene diisocyanate, 1,8-naphthalene diisocyanate, 2,6-diisocyanatobenzofuran, 2,4,5-toluene triisocyanate, their carbodiimide modified products, biuret compounds, dimers, trimers, and their isocyanate terminated prepolymers which are obtained by the reaction of the polyisocyanates with compounds having active hydrogens therein. These modified polyisocyanates are well known in the production of polyurethane foams. These polyisocyanates may be used singly or as mixtures of two or more.

Among these polyisocyanates, however, aromatic ones are preferred from the standpoint of mechanical strength and hardness of foams.

Conventional methods may be employed to produce rigid polyurethane foams. The polyol composition is used in such a manner that an equivalence ratio of isocyanate groups in the polyisocyanates used to hydroxyl groups in the polyol composition, i.e., NCO/OH ratio or isocyanate index, is preferably in the range of 0.8–1.5, more preferably of 0.9–1.1.

Blowing agents and catalysts are used together with the polyol composition and polyisocyanates in the production of rigid polyurethane foams, as well known in the art, and when desired also surfactants, fire retardants, colorants, cross-linking agents, and the like.

There may be used any known catalyst, such as amines or organometal catalysts. More specifically, the amine catalysts include, for example, triethylamine, tripropylamine, tributylamine, trioctylamine, hexadecyldimethylamine, N-methylmorpholine, N-ethylmorpholine, N-octadecylmorpholine, monoethanolamine, diethanolamine, triethanolamine, triisopropanolamine, N-methyldiethanolamine, N,N-dimethyldiethanolamine, diethylenetriamine, N,N,N',N'-tetramethylethylenediamine, N,N,N',N'-tetramethylpropylenediamine, N,N,N',N'-tetramethyl-1,3-butanediamine, N,N,N',N'-tetramethylhexamethylenediamine, bis[2-(N,N-dimethylamino)ethyl]ether, N,N-dimethylbenzylamine, N,N-dimethylcyclohexylamine, N,N,N',N'-pentamethyldiethylenetriamine, triethylenediamine, carboxylic acid salts of amines such as formate of triethylenediamine, and oxyalkylene adducts to primary or secondary amines.

The organometal catalysts used include, for example, stannous acetate, stannous octanoate, stannous oleate, stannous laurate, dibutyltin dichloride, lead octanoate, lead naphthenate, nickel naphthenate and cobalt naphthenate.

The catalysts may be used singly or as mixtures in amounts usually of 0.001–5 parts by weight in relation to 100 parts by weight of compounds having active hydrogens therein used.

The blowing agents used include water and halogenated hydrocarbons known in the art, such as trichlorofluoromethane, dichlorodifluoromethane, methylene chloride, trichlorotrifluoroethane, dibromotetrafluoroethane, trichloroethane, and aliphatic hydrocarbons such as pentane or n-hexane. The blowing agents may also be used singly or as mixtures. Water is used in amounts usually of 0.05–2.0% by weight, preferably of 0.2–1.0% by weight, based on the total amount of the compounds having active hydrogens therein including the polyols used and the polyisocyanates used. The halogenated hydrocarbons are used in amounts usually of 0–12% by weight based on the total amount of the compounds having active hydrogens therein including the polyols used and the polyisocyanates used.

As surfactants, there may be used organosilicone surfactants, as well known in the art. However, it is necessary to form microcells to prevent the generation of voids in the resultant foam products, and from this standpoint, the use of L-520, L-532, L-540, L-544, L-550, L-3550, L-3600, L-3601, L-5305, L-5307, L-5309, L-5710, L-5720 or L-5740M by Nippon Unicar, SH-190, SH-192, SH-194, SH-200, SRX-274C, SF-2961, SF-2962, SRX-280A or SRX-294A by Toray Silicone, F-114, F-121, F-122, F-220, F-230, F-258, F-260B, F-317, F-341, F-601 or F-335 by Shinethsu Silicone is preferred. These foam stabilizers are used in amounts of 0.25-2 parts in relation to 100 parts by weight of the total of the compounds which have active hydrogens including the polyols and the polyisocyanates used.

Cross-linking agents may also be used in the foaming, which may be exemplified by glycols such as ethylene glycol, propylene glycol, diethylene glycol, triethylene glycol, dipropylene glycol, trimethylene glycol, 1,3-butanediol or 1,4-butanediol; alkanolamines such as diethanolamine or triethanolamine; aliphatic polyamines such as ethylenediamine, diethylenetriamine or triethylenetetramine; or aromatic diamines such as methylene-o-chloroaniline, 4,4'-diaminodiphenylmethane, 2,4-tolylenediamine or 2,6-tolylenediamine. These cross-linking agents may be used usually in amounts of 5-15 parts by weight in relation to 100 parts by weight of the polyols used.

There may be used a RIM method or an injection method with low or high pressure foaming machines. Usually molds are maintained at temperatures of 30°-70° C., preferably of 35°-60° C., into which the polyol composition, the polyisocyanates and the other additives as described hereinbefore are injected at temperatures of 20°-40° C., preferably of 25°-35° C. The so-called pack ratio, a ratio of density of foams when free-foamed to density of foams as molded articles, is usually in the range of 1-5, preferably of 1.5-3.5. The resultant rigid polyurethane foams have a density of 0.08-0.4 g/cm$^3$, preferably of 0.15-0.35 g/cm$^3$.

As set forth above, since the method of the invention uses alkylene oxide adducts (I) to hydroquinone together with adducts of alkylene oxides to such specific polyfunctional monomeric compounds as described before, the resultant rigid polyurethane foams have high heat resistance and toughness as well as high mechanical strength.

The invention will now be described more specifically with reference to examples, however, the invention is not limited thereto.

REFERENCE EXAMPLE 1

An amount of 5 kg of 1,4-bis(hydroxyethoxy)benzene was placed in a pressure reactor provided with a thermometer and a stirrer, and there were added thereto 50 g of potassium hydroxide flake. The inside of the reactor was displaced with nitrogen, and the mixture was heated to 120°-130° C. to melt the potassium hydroxide. While maintaining the temperature of the mixture at 110°-130° C., 20.5 kg of ethylene oxide were added to the mixture over seven hours, and then the mixture was stirred for another one hour at the temperature. A small amount of unreacted ethylene oxide remained in the reactor was then stripped with nitrogen.

The reaction mixture was cooled to 90°-110° C., and small amounts of water and 250 g of synthetic magnesium silicate were added to the reaction mixture, and then the mixture was stirred for about one hour. Thereafter, the magnesium silicate was removed by filtration, and the residuals were dehydrated, followed by the addition thereto of 12 g of di-t-butylhydroxytoluene.

The thus obtained ethylene oxide adducts were pale yellow viscous liquid containing 0.02% of water. The adducts were found to have a hydroxyl value of 110 and a pH of 6.7, and contain 18.7 moles of ethylene oxide added per mole of 1,4-bis(hydroxyethoxy)benzene.

EXAMPLES 1-5 AND COMPARISON EXAMPLES 1 AND 2

Compositions were prepared of which components are shown in the Table 1. The compositions were injected into molds of iron having a molding space of 1000 mm × 250 mm × 10 mm, and foamed under heating for three minutes, to provide rigid polyurethane foam sheets. The properties of the foam sheets are shown in the Table 1.

The polyols and polyisocyanates used were as follows.

Polyol A: propylene oxide adducts to sucrose/glycerine of a hydroxyl value of 460;
Polyol B: ethylene oxide adducts to trimethylolpropane of a hydroxyl value of 920;
Polyol C: ethylene oxide adducts to 1,4-bis(hydroxyethoxy)benzene of a hydroxyl value of 110;
Polyol D: propylene oxide adducts to ethylenediamine of a hydroxyl value of 500; and
Polyol E: propylene oxide adducts to sucrose/dipropylene glycol of a hydroxyl value of 500.
Polyisocyanate: polyphenylene polymethylene polyisocyanate (Millionate MR-200 by Nippon Polyurethane Kogyo K.K.).

The test specimens of 13 mm × 110 mm × 10 mm (thick) and 30 × 30 × 10 mm (thick) were prepared. With the former flexural strength and modulus were measured with a span of 50.8 mm, while with the latter compressive strength was measured by compressing the specimens by 30% in the direction of thickness. The results are shown in the Table 1 as properties as produced.

The specimens were left standing at 100° C. for 1000 hours, and then flexural strength, flexural modulus and compressive strength were measured in the same manner as above. The results are shown in the Table 1 as properties after durability test.

As seen, the foams according to the invention are well-balanced in strength and toughness, but also of high heat resistance, and hence of high durability.

TABLE 1

| | Examples | | | | | Comparisons | |
|---|---|---|---|---|---|---|---|
| | 1 | 2 | 3 | 4 | 5 | 1 | 2 |
| COMPOSITIONS* | | | | | | | |
| Polyol A | 45 | 50 | 35 | — | — | 100 | 60 |
| Polyol B | 25 | 25 | 25 | 30 | 25 | — | 30 |
| Polyol C | 30 | 25 | 40 | 35 | 40 | — | 10 |
| Polyol D | — | — | — | 35 | — | — | — |
| Polyol E | — | — | — | — | 35 | — | — |
| Ethylene glycol | 10 | 10 | 10 | 10 | 10 | 10 | 10 |
| Water | 1.0 | 1.0 | 1.0 | 1.0 | 1.0 | 1.0 | 1.0 |
| Freon-11 | 6.0 | 6.0 | 6.0 | 6.0 | 2.0 | 6.0 | 6.0 |
| Dubco 33LV | 1.5 | 1.5 | 1.5 | 1.5 | 1.8 | 1.5 | 1.5 |
| F-335 | 1.0 | 1.0 | 1.0 | 1.0 | 1.0 | 1.0 | 1.0 |
| Isocyanate Index | 1.05 | 1.05 | 1.05 | 1.05 | 1.05 | 1.05 | 1.05 |
| FOAMS | | | | | | | |

TABLE 1-continued

|  | Examples | | | | | Comparisons | |
| --- | --- | --- | --- | --- | --- | --- | --- |
|  | 1 | 2 | 3 | 4 | 5 | 1 | 2 |
| As Produced | | | | | | | |
| Density (g/cm$^3$) | 0.2 | 0.2 | 0.2 | 0.2 | 0.3 | 0.2 | 0.2 |
| Compression strength (kg/cm$^2$) | 18.3 | 17.1 | 20.4 | 24.7 | 33.4 | 22.4 | 17.4 |
| Flexural modulus (kg/cm$^2$) | 930 | 870 | 1080 | 1560 | 2600 | 1240 | 1640 |
| Flexural strength (kg/cm$^2$) | 68 | 62 | 72 | 84 | 103 | 76 | 76 |
| After Durability Test | | | | | | | |
| Compression strength (kg/cm$^2$) | 18.8 | 17.0 | 20.3 | 23.8 | 34.2 | 13.6 | 12.6 |
| Flexural modulus (kg/cm$^2$) | 948 | 960 | 1010 | 1470 | 2480 | 740 | 834 |
| Flexural strength (kg/cm$^2$) | 63 | 61.5 | 73 | 82.4 | 98 | 41 | 47 |

Notes:
*parts by weight

What is claimed is:

1. A polyol composition for producing rigid polyurethane foams which comprises:
   (a) a first polyol having the formula:

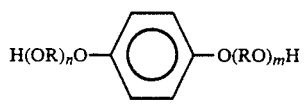

wherein R independently represents an ethylene group or a propylene group, m and n are integers of not less than 1, respectively, and m+n are in the range of 3-40, in amounts of 20-50% by weight based on the polyol composition; and
   (b) a second polyol selected from the group consisting of adducts of ethylene oxide, propylene oxide, butylene oxide or both ethylene oxide and propylene oxide to at least one tri or more functional polyhydric alcohol or polyamino compound.

2. The polyol composition as claimed in claim 1 wherein the first polyol has a hydroxyl value of 50-480.

3. The polyol composition as claimed in claim 1 wherein the second polyol has a hydroxyl value of not less than 400.

4. The polyol composition as claimed in claim 1 wherein the second polyol has a hydroxyl value of 450-1000.

5. The polyol composition as claimed in claim 1 wherein the tri or more functional polyhydric alcohol is an aliphatic or an alicyclic polyhydric alcohol.

6. The polyol composition as claimed in claim 1 wherein the tri or more functional polyhydric alcohol is at least one member selected from the group consisting of sucrose, glycerine and trimethylolpropane.

7. The polyol composition as claimed in claim 1 wherein the composition further contains adducts of alkylene oxides to glycols.

8. The polyol composition as claimed in claim 1 wherein the polyamino compound is ethylenediamine.